(12) United States Patent
Norden

(10) Patent No.: US 8,731,796 B2
(45) Date of Patent: May 20, 2014

(54) DEVICE FOR THE ENERGY MANAGEMENT OF A VEHICLE

(75) Inventor: Roland Norden, Markgroeningen (DE)

(73) Assignee: Robert Bosch GmbH, Stuttgart (DE)

(*) Notice: Subject to any disclaimer, the term of this patent is extended or adjusted under 35 U.S.C. 154(b) by 297 days.

(21) Appl. No.: 13/132,036

(22) PCT Filed: Nov. 27, 2009

(86) PCT No.: PCT/EP2009/065950
§ 371 (c)(1),
(2), (4) Date: Aug. 11, 2011

(87) PCT Pub. No.: WO2010/079007
PCT Pub. Date: Jul. 15, 2010

(65) Prior Publication Data
US 2011/0307131 A1    Dec. 15, 2011

(30) Foreign Application Priority Data
Jan. 9, 2009   (DE) .......................... 10 2009 000 115

(51) Int. Cl.
*G06F 19/00*   (2011.01)

(52) U.S. Cl.
USPC ........................................................... 701/99

(58) Field of Classification Search
CPC ....... B60W 20/00; B60W 10/26; B60L 11/00; G06F 17/00; G06F 19/00; G06G 7/70
USPC .......... 701/22, 48, 69, 78, 82, 83, 86, 99, 100
See application file for complete search history.

(56) References Cited

U.S. PATENT DOCUMENTS 5,507,153 A    4/1996   Seto et al.
2006/0259219 A1   11/2006   Wakiyama

FOREIGN PATENT DOCUMENTS

| DE | 102 53 707 | | 6/2003 | |
|---|---|---|---|---|
| FR | 2 820 369 | | 8/2002 | |
| FR | 2 883 928 | | 10/2006 | |
| JP | 2003-158801 | * | 5/2003 | ................ B60L 7/10 |
| JP | 2006-347535 | | 12/2006 | |

* cited by examiner

*Primary Examiner* — Kim T Nguyen
(74) *Attorney, Agent, or Firm* — Kenyon & Kenyon LLP

(57) ABSTRACT

A device for the energy management of a vehicle, which has an air-conditioning system and a controller controlling the air-conditioning system. The air-conditioning system includes an air-conditioning compressor coupled mechanically to the drive train and a thermal storage unit. The controller controls the air-conditioning compressor in such a way that the energy efficiency of the vehicle is improved.

13 Claims, 2 Drawing Sheets

DEVICE FOR THE ENERGY MANAGEMENT OF A VEHICLE

BACKGROUND INFORMATION

Contingent upon the current $CO_2$ climate debate and rising raw material prices for fossil fuels, the motor vehicle industry is taking care to reduce the fuel consumption of motor vehicles.

One possible way of achieving these goals is to electrify the drive train of the vehicle, to improve the efficiency chain and to regain energy. Possibilities for implementing this are start-stop vehicles, for example, hybrid vehicles, fuel cell vehicles and electric vehicles.

In comparison to the usual vehicles having internal combustion engines, current electric vehicles have clearly reduced ranges, which cover only 100 to 150 kilometers. In order to enable these current electric vehicles to travel farther, one would need a suitable infrastructure for charging, as well as a charging duration of several hours.

For this reason, high efficiency and a reduction in any energy losses would be desirable for electric vehicles. Measures are required that increase the range of the vehicle, and make possible a reduction in the storage capacity of the costly traction battery. But high energy efficiency is also of advantage for other vehicle types.

Vehicles having an electrified drive train have a traction battery. The latter has to be operated in temperature ranges that are below 40° C. As a consequence, in hot climatic zones, in such vehicles, coupling is necessary to the cooling circulation of the air conditioning system of the respective vehicle.

Newer vehicles having a start-stop function are typically equipped with electrically operated air-conditioning compressors, so that, if necessary, they are able to assure air conditioning of the passenger cell and of the traction battery, even during stops of the internal combustion engine.

Moreover, it has been suggested that a thermal storage unit be used, to cover the energy requirement of a vehicle during brief stopping phases.

SUMMARY OF THE INVENTION

By contrast, a device for energy management of a vehicle, according to the present invention, has several advantages. On the one hand, the overall energy efficiency of the vehicle is increased. This results in an increase in the range of the vehicle and in a reduction of the storage of the vehicle's battery. A cost reduction is also connected with this. Furthermore, based on the use of a mechanically driven air-conditioning compressor instead of an electrically driven air-conditioning compressor, a simpler and more robust device is provided. The use of a thermal storage unit instead of an electric battery storage unit as an energy storage mechanism for air conditioning is advantageous, since a thermal storage unit is more cost-effective, and is also not subject to any ageing effects. Moreover, mechanically driven air-conditioning compressors are clearly more cost-effective, based on the producibility of large piece numbers and a low number of components, and they are lighter. Furthermore, known electric air-conditioning compressors are typically designed as high-voltage compressors. By the use of a mechanical air-conditioning compressor, safety is increased and so are the possibilities of installation within the accident deformation zones of the respective vehicle.

DETAILED DESCRIPTION

Figure 1:
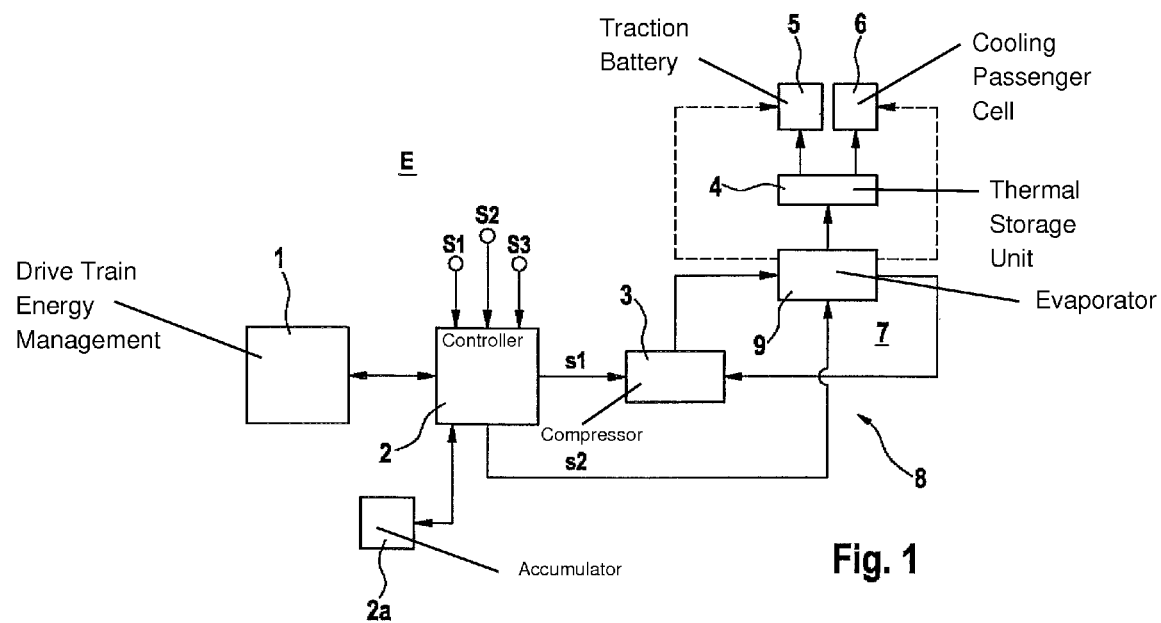
FIG. 1 shows a block diagram of a device for the energy management of a vehicle.

FIG. 1 shows a block diagram of a device for the energy management of a vehicle. This vehicle is preferably an electric vehicle. A device for energy management according to the present invention may also be used, however, for vehicles having internal combustion engines, vehicles having start-stop functionality, hybrid vehicles, plug-in hybrid vehicles and fuel cell vehicles.

Electric vehicle E shown in FIG. 1 has a device for energy management, for which a controller 2, an accumulator 2a, sensors S1, S2 and S3, an air-conditioning system 8 having a cooling medium circulation 7, in which an air-conditioning compressor 3 coupled mechanically to the drive train, an evaporator 9 and a thermal storage unit 4 are provided, and to which the drive train energy management 1 of the electric vehicle belong.

Furthermore, FIG. 1 shows traction battery 5 and passenger cell 6.

Controller 2 is in bidirectional connection with drive train-energy management 1. Furthermore, it is connected to sensors S1, S2 and S3, and receives from them sensor signals that are made available. These sensor signals include data on thermal parameters. Sensor 1, for example, supplies data about the temperature of thermal storage unit 4, sensor S2 supplies data on the temperature of traction battery 5 and sensor S3 supplies data on a temperature of the drive motor of the vehicle that is not shown in FIG. 1.

The data supplied by sensors S1, S2 and S3 on the thermal parameters as well as additional vehicle parameters, which are supplied to controller 2 by drive train-energy management 1 of the vehicle, are evaluated by controller 2 and converted to control signals s1 and s2. Using control signal s1, controller 2 controls mechanical air-conditioning compressor 3, using control signals s2, it controls thermal storage unit 4, for instance, via valves or air flaps.

The evaluation of the data supplied to controller 2 preferably takes place while using an ageing temperature calculation model of traction battery 5, which represents a further thermal parameter and is stored in storage unit 2a that is associated with controller 2.

Accordingly, in a device according to the present invention, energy management takes place while using thermal parameters, which are converted by controller 2 to control signals for a mechanical air-conditioning system compressor 3 and a thermal storage unit 4, which are both components of cooling medium circulation 7 of air-conditioning system 8 of the vehicle. The cooling energy stored in thermal storage unit 4 is used, for instance, for cooling traction battery 5 and for cooling passenger cell 6 of the vehicle. Alternatively to this, traction battery 5 or passenger cell 6 may also have supplied to them cooling energy directly from mechanical air-conditioning compressor 3 via evaporator 9, which is indicated in FIG. 1 using dashed lines.

Using the abovementioned control of mechanical air-conditioning compressor 3 and of thermal storage unit 4 by controller 2, the following measures may be implemented for improving the energy efficiency of the vehicle:

Recuperation of braking energy may take place in that the braking energy of the vehicle is converted into cooling energy by increasing the load of mechanical air-conditioning compressor 3. This cooling energy may be used either directly for cooling traction battery 5 or passenger cell 6, or may first be temporarily stored in thermal storage unit 4 and then supplied to the traction battery at a later time.

Vehicles having an electrified drive train store braking energy typically in electrical form, directly in a battery. If this battery is charged, the braking energy can no longer be used. Because of the abovementioned conversion of the braking energy into cooling effort, utilization of the braking energy continues to be possible, even in the case of a charged battery. This is particularly advantageous for vehicles having a low battery storage capacity. Moreover, this is advantageous if long recuperation phases occur, for instance, during long downhill travel.

Figure 2:
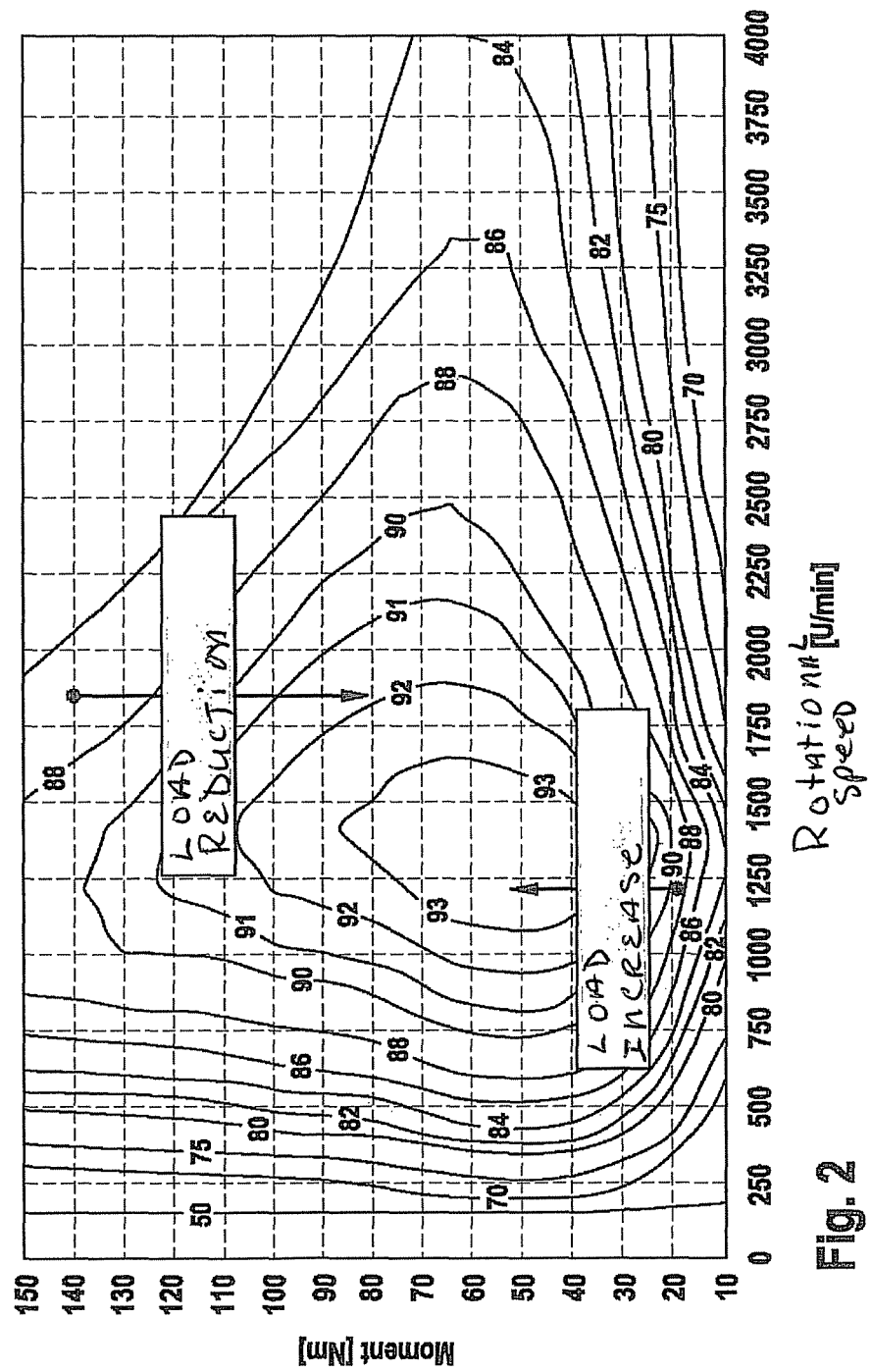
FIG. 2 shows a diagram for the illustration of an operating point shift in the efficiency characteristics map of an electric machine.

An additional measure for improving energy efficiency of the vehicle may be achieved in that, by increasing or decreasing the compressor load, the operating point of an electric machine of the vehicle is shifted to an operating point having better efficiency. This becomes possible in the case of drive trains having coupling of an air-conditioning compressor and an electric machine. The base function is illustrated in FIG. 2, in which the efficiency characteristics map of an electric machine is shown. The torque of the electric machine is plotted along the ordinate and its rotational speed along the abscissa. The arrow pointing upwards thereby illustrates a load increase, and the arrow pointing downwards illustrates a load reduction in the direction of the region of better efficiency.

In addition, to improve the energy efficiency, the efficiency of the air-conditioning of the vehicle is improved. When an electric air-conditioning compressor is used for air conditioning traction battery 5 or passenger cell 6, a long efficiency chain has to be run through. When a device according to the present invention is used, the necessity for electric energy conversions drops out. Furthermore, traction battery 5 heats up during temporary storage of electrical energy, whereby an additional requirement for air conditioning the traction battery is created. By using a device according to the present invention, no additional heat is created in the battery.

A direct utilization of the braking energy or the drive energy for cooling generation using a mechanical air-conditioning compressor without temporary storage in thermal storage unit 4 always has an improved efficiency. But even in the case of temporary storage of the cooling energy in thermal storage unit 4, there is, as a rule, an improved efficiency chain.

An additional advantage of the present invention may be achieved in vehicles of light construction, which have a high air conditioning requirement. In such vehicles, compressor loads may occur which are of the order of magnitude of the drive power of the vehicle. A compressor control may be undertaken by controller 2 in such a way that a jerking in the drive train, which occurs, for instance, during shifting processes, may be specifically counteracted.

As thermal storage unit 4, a latent heat storage may be used, for example.

Instead of utilizing a conventional cooling circulation, one may also use a cooling circulation having a heat pump function for generating heat. The heat given off is then available, for instance, for heating the battery or the passenger cell.

FIG. 1 shows controller 2 and drive train-energy management 1 as separate components. Alternatively to that, it is also possible to implement drive train-energy management 1 and controller 2 in the form of a single component.

What is claimed is:

1. A device for an energy management of a vehicle, which has an air-conditioning system, the air-conditioning system having a mechanical air-conditioning compressor that is mechanically coupled to a drive train and a thermal storage unit, the device comprising:
a controller for controlling the air-conditioning system and for evaluating data on thermal parameters of the vehicle, the controller making available to the mechanical air-conditioning compressor control signals ascertained by the evaluation of the data on the thermal parameters, wherein the controller is connected to a drive train-energy management of the vehicle and makes available the control signals as a function of data which are supplied to the controller by the drive train-energy management.

2. The device according to claim 1, wherein the controller controls the air-conditioning compressor in such a way that a kinetic energy of the vehicle is converted into cooling energy, according to demand, by changing a load of the air-conditioning compressor.

3. The device according to claim 1, wherein the cooling energy made available by the air-conditioning compressor is temporarily stored in the thermal storage unit under control by the controller and, under the control by the controller, is routed from the thermal storage unit to at least one of a traction battery and a passenger cell of the vehicle.

4. The device according to claim 3, wherein the cooling energy made available by the air-conditioning compressor is routed directly to the traction battery or the passenger cell of the vehicle.

5. The device according to claim 1, wherein the controller controls the air-conditioning compressor in such a way that an operating point of an electric machine of the vehicle is shifted.

6. The device according to claim 1, wherein the controller controls the air-conditioning compressor in such a way that a jerking in the drive train of the vehicle is counteracted.

7. The device according to claim 1, wherein the thermal storage unit is a latent heat storage unit.

8. The device according to claim 1, wherein a cooling medium circulation is able to be operated according to a principle of a heat pump for generating heat in combination with a heat storage unit.

9. The device according to claim 1, wherein the drive train-energy management makes available to the controller the data on the thermal parameters.

10. The device according to claim 1, further comprising sensors which are connected to the controller and which make available to the controller data on the thermal parameters.

11. The device according to claim 1, wherein the thermal parameters include data on a temperature of the thermal storage unit, a temperature of a traction battery, or an ageing temperature calculation model of the traction battery.

12. The device according to claim 1, wherein the vehicle is an electric vehicle or a hybrid vehicle.

13. The device according to claim 1, wherein the control signals result in an increase of a load of the air-conditioning compressor to produce a conversion of a braking energy of the vehicle into a cooling energy.

* * * * *